US008576736B1

(12) United States Patent
Sigg et al.

(10) Patent No.: US 8,576,736 B1
(45) Date of Patent: Nov. 5, 2013

(54) METHOD AND SYSTEM FOR SPREAD SPECTRUM SIGNAL ACQUISITION WITHOUT A PILOT SIGNAL

(75) Inventors: Jason P. Sigg, Overland Park, KS (US); Ashish Bhan, Shawnee, KS (US); Maulik K. Shah, Overland Park, KS (US); Jasinder P. Singh, Olathe, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 323 days.

(21) Appl. No.: 12/943,141

(22) Filed: Nov. 10, 2010

(51) Int. Cl.
*H04L 5/22* (2006.01)

(52) U.S. Cl.
USPC .......................................... 370/252; 370/254

(58) Field of Classification Search
USPC .................. 370/252, 254, 328, 338, 400, 401
See application file for complete search history.

(56) References Cited

U.S. PATENT DOCUMENTS

| | | | |
|---|---|---|---|
| 5,742,637 A | 4/1998 | Kanterakis et al. | |
| 5,764,630 A | 6/1998 | Natali et al. | |
| 5,768,307 A | 6/1998 | Schramm et al. | |
| 5,781,543 A | 7/1998 | Ault et al. | |
| 5,805,648 A | 9/1998 | Sutton | |
| 6,028,888 A | 2/2000 | Roux | |
| 6,154,483 A | 11/2000 | Davidovici et al. | |
| 6,304,592 B1 | 10/2001 | Davidovici et al. | |
| 6,714,789 B1 | 3/2004 | Oh et al. | |
| 6,873,647 B1 * | 3/2005 | Tiedemann et al. | 375/145 |
| 6,965,633 B2 | 11/2005 | Sun et al. | |
| 7,092,722 B1 | 8/2006 | Oh et al. | |
| 7,218,617 B1 | 5/2007 | Usuda et al. | |
| 2012/0127944 A1* | 5/2012 | Yoon et al. | 370/329 |

OTHER PUBLICATIONS

Piero Castoldi et al., "An Optimal Receiver for CDMA forward link without pilot tone," Proc. 1997 IEEE Pacific Rim Conference on Communications, Computers, and Signal Processing (PACRIM '97), Aug. 1997.
Tero Ojanperä and Ramjee Prasad, "WCDMA: towards IP mobility and mobile internet," Artech House, 2001, pp. 171-205.
Peter Chong, "WCDMA Physical Layer (Chapter 6)," Nokia Research Center, 2002.
Vijay K. Garg, "IS-95 CDMA and cdma2000," Prentice Hall PTR, 2000, pp. 9-40.

* cited by examiner

*Primary Examiner* — Yemane Mesfin
*Assistant Examiner* — Mon Cheri Davenport

(57) ABSTRACT

A cellular wireless communication network transmits spread spectrum signals that are spread by a pseudonoise (PN) code with any of a plurality of PN offsets, such that different coverage areas use different PN offsets. In each coverage area, the network transmits a plurality of forward link channels, each defined by a respective Walsh code, without transmitting a pilot signal. A wireless communication device (WCD) begins operating in a given coverage area and determines the PN offset used in the given coverage area by receiving a forward link signal having a Walsh code of a sync channel, paging channel, or other channel that transmits a broadcast message. The WCD selects a target bit sequence that would be expected to be included in the broadcast message. The WCD finds an effective PN offset that enables the WCD to despread the forward link signal and recover the target bit sequence.

20 Claims, 4 Drawing Sheets

METHOD AND SYSTEM FOR SPREAD SPECTRUM SIGNAL ACQUISITION WITHOUT A PILOT SIGNAL

BACKGROUND

Digital data can be communicated wirelessly by using spread spectrum techniques. In a typical spread spectrum approach, a data signal, d(t), is wirelessly transmitted by encoding the signal with a Walsh function, w(t), that corresponds to a Walsh code, spreading the encoded signal with a pseudonoise (PN) sequence, g(t), and then using the spread signal to modulate a radio frequency (RF) carrier, for example, using binary phase shift keying (BPSK) or quadrature phase shift keying (QPSK). The resulting spread spectrum signal, S(t), may be represented as:

$$S(t)=d(t)w(t)g(t)\cos 2\pi f_c t$$

where $f_c$ is the carrier frequency. A receiver may receive this spread spectrum signal as a received signal, R(t), which may be represented as:

$$R(t)=d(t)w(t)g(t)\cos [2\pi f_c t+\phi(t)]$$

where $\phi(t)$ is a phase which may vary as a function of time, for example, because of the receiver's motion relative to the transmitter.

The receiver may recover the data signal, d(t), from R(t) in several steps. As one step in the process, the receiver may demodulate the received signal, R(t), to obtain a baseband signal, B(t). Typically, coherent demodulation is used, which involves multiplying R(t) by a reference signal having the same frequency and phase, followed by low-pass filtering. The resulting baseband signal, B(t), may be represented by:

$$B(t)=d(t)w(t)g(t)$$

B(t) may be despread by multiplying by g(t) and decoded by multiplying by w(t). The result may then be integrated over a Walsh period, i.e., a time period over which different Walsh functions are orthogonal, to recover d(t). This process is illustrated in FIG. 1.

In many systems, the reference signal is obtained from a pilot signal that is transmitted along with S(t). The pilot signal is typically a signal that contains no data but is spread by the same PN sequence as S(t). Thus, the pilot signal is often described as a transmission of all zeroes that is encoded by Walsh code, $W_0$, a code which has all zeroes. In that case, the pilot signal received by the receiver can be represented as:

$$P(t)=g(t)\cos [2\pi f_c t+\phi(t)]$$

The reference signal can be obtained from this received pilot signal by multiplying P(t) by g(t) and then using a phase locked loop (PLL). Alternatively, the reference signal can be generated from R(t), for example, by using a Costas loop or squaring loop. Thus, while a pilot signal is typically used for coherent demodulation of spread spectrum signals, coherent demodulation can also be achieved without a pilot signal.

In addition to the reference signal, the PN sequence, g(t), and the Walsh function, w(t), are also used to recover the data signal, d(t), from the received signal, R(t). The receiver may generate w(t) based on the Walsh code of the particular forward link channel that the receiver is receiving. For example, IS-95 CDMA supports the use of 64 Walsh codes, identified as $W_0$ through $W_{63}$, to define 64 forward link channels, including a pilot channel, a sync channel, up to seven paging channels, and forward traffic channels. Walsh code $W_0$ corresponds to the pilot channel, Walsh code $W_{32}$ corresponds to the sync channel, Walsh codes $W_1$ through $W_7$ may be used for paging channels, and the remaining Walsh codes correspond to forward traffic channels. Thus, to receive the sync channel, the receiver may use the Walsh function, $w_{32}(t)$, that corresponds to Walsh code $W_{32}$ and, to receive a paging channel, the receiver may use the Walsh function, $w_1(t)$, that corresponds to Walsh code $W_1$. Forward traffic channels are typically assigned by the network for particular communication sessions. Thus, when a receiver is assigned a forward traffic channel that is identified by Walsh code $W_i$, the receiver may use the corresponding Walsh function, with $w_i(t)$ to receive the assigned traffic channel.

Typically, the receiver is also be able to generate the PN sequence, g(t), that is used to despread R(t). In IS-95 CDMA, g(t) is a "short code" sequence of 32,767 chips which are transmitted at a rate of 1.2288 MHz. Thus, the short code is repeated every 26.667 milliseconds, or 75 times every 2 seconds. In a cellular wireless communications network, each wireless coverage area (e.g., a cell or sector) uses the same short code, but with a characteristic time offset relative to every even second in a standard time base (e.g., GPS time). The offsets are in increments of 64 chips to provide 512 possible offsets. In practice, a cellular wireless communications network might use only every $N^{th}$ offset, where N is an integer greater than one. For example, if N=2, there would be 256 possible offsets.

When a wireless communication device first powers up in a given wireless coverage area of a cellular wireless network, the device may not know which of the possible offsets is being used in that area. In addition, the device may be receiving multiple signals from multiple base stations, each with a different offset. As a result, the signal that the device receives initially is effectively an unknown signal. To determine which of the 512 (or fewer) possible offsets is being used in its area, the device may use a trial-and-error approach in which the device selects a particular offset and determines whether a pilot signal with that offset can be found in the unknown received signal.

For example, to determine whether a pilot signal that uses the $i^{th}$ possible offset is in the received signal, the device may generate a PN sequence, $g(t+P_i)$, where $P_i$ is a phase corresponding to the $i^{th}$ offset, and then multiply the received signal by $g(t+P_i)$. Because of the pseudorandom nature of the "short code" PN sequence, the energy of the product is essentially zero unless the phase in the generated PN sequence matches the phase of the PN sequence in the received signal. Thus, if the energy of the product is sufficiently above zero (e.g., greater than a threshold), then the device may determine that it has found a useable pilot signal. Otherwise, the device may try a different offset, and then another, until the device finds a useable pilot signal.

Once the wireless communication device has found a useable pilot signal in the unknown received signal, the device can receive other forward link channels that use the same offset. For example, the device may start receiving a sync channel or a paging channel. In so doing, the device may use the pilot signal to coherently demodulate the other forward link channels, and the device may use the known offset of the pilot signal to generate a PN sequence that will despread the other forward link channels.

Overview

In a first principal aspect, an exemplary embodiment provides a method for signal acquisition in a wireless network in which forward link signals are spread by a pseudonoise (PN) sequence with any of a plurality of PN offsets. A wireless communication device (WCD) receives a forward link signal transmitted by the wireless network. The forward link signal is spread by the PN sequence with an unknown PN offset. The forward link signal encodes a target bit sequence that is time-multiplexed with an additional bit sequence, the additional bit sequence being different than the target bit sequence. The WCD finds an effective PN offset that enables the WCD to despread the forward link signal and recover the target bit sequence.

In a second principal aspect, an exemplary embodiment provides a method for a wireless communication device (WCD). The WCD receives a spread spectrum signal that is spread by a pseudonoise (PN) code of unknown phase. The WCD coherently demodulates the spread spectrum signal, without using a pilot signal, to obtain a baseband signal. The WCD generates the PN sequence with a target phase to provide a target PN sequence. The WCD also generates a target Walsh function that corresponds to a target Walsh code. The WCD applies the target PN sequence and the target Walsh function to the baseband signal to obtain a product signal. The WCD integrates the product signal over successive Walsh code periods to obtain a recovered bit sequence. The WCD compares the recovered bit sequence to a target bit sequence.

In a third principal aspect, an exemplary embodiment provides a wireless communication device (WCD). The WCD comprises: (1) an antenna for wirelessly receiving a spread spectrum signal, wherein the spread spectrum signal is spread by a pseudonoise (PN) code of unknown phase; (2) a demodulator for coherently demodulating the spread spectrum signal, without using a pilot signal, to provide a baseband signal; (3) a PN sequence generator for generating the PN sequence with a target phase to provide a target PN sequence; (4) a Walsh function generator for generating a target Walsh function corresponding to a target Walsh code; (5) a correlator for applying the target PN sequence and target Walsh function to the baseband signal to obtain a product signal; (6) an integrator for integrating the product signal over successive Walsh code periods to obtain a recovered bit sequence; and (7) a comparator for providing an output based on a comparison of the recovered bit sequence to a target bit sequence.

In a fourth principal aspect, an exemplary embodiment provides a cellular wireless communication network comprising a plurality of base stations configured to transmit, in a plurality of wireless coverage areas, spread spectrum signals that are spread by a pseudonoise (PN) code with any of a plurality of PN offsets, such that different PN offsets are used in different wireless coverage areas. The plurality of base stations include at least one base station that defines at least one wireless coverage area in which said at least one base station is configured to transmit spread spectrum signals without transmitting a pilot signal.

DETAILED DESCRIPTION OF EXEMPLARY EMBODIMENTS

1. Introduction

Figure 1:
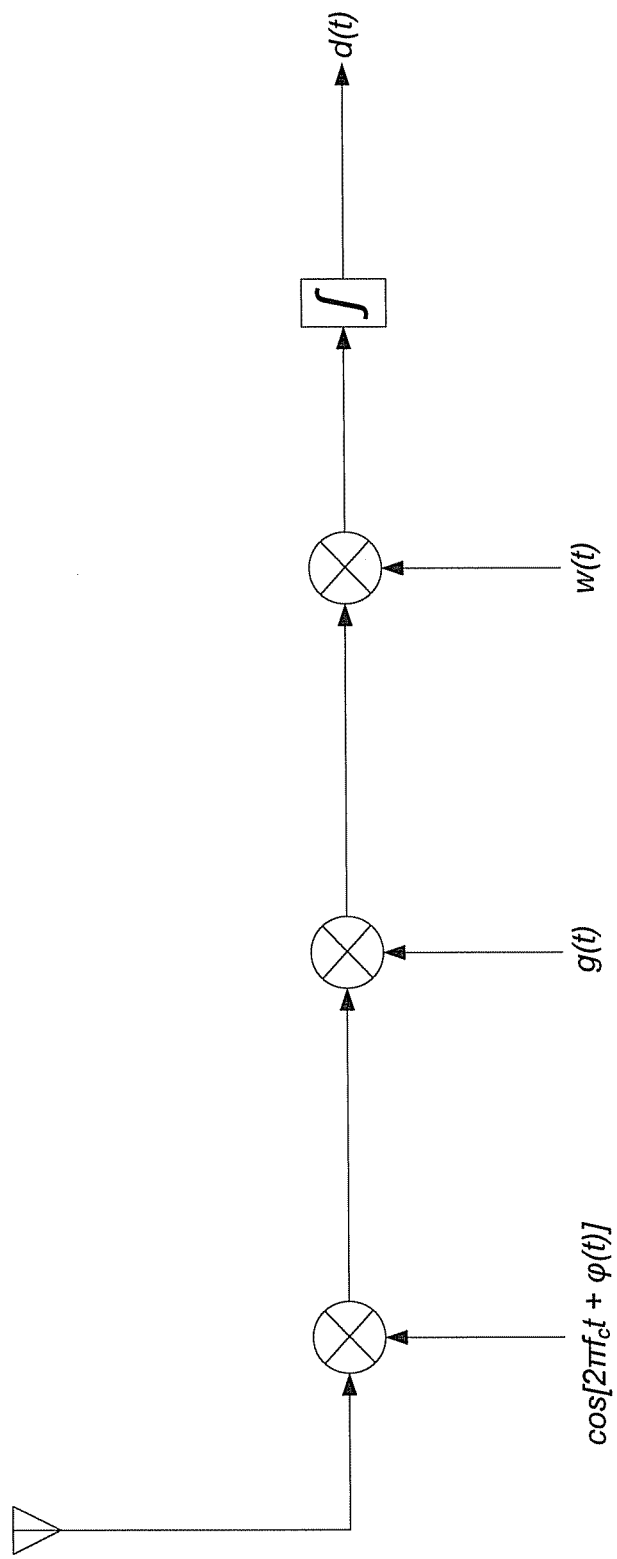
FIG. 1 is a schematic diagram of a conventional spread spectrum receiver.

The inventors have recognized that the conventional approach of transmitting a forward link pilot signal in spread spectrum communication systems, such as cellular wireless networks, can be disadvantageous because the forward link pilot signal typically accounts for about 15% of the RF power that is transmitted in any given wireless coverage area and because the pilot signal can cause interference with other forward link signals transmitted in the given coverage area. Thus, the inventors propose spread spectrum communication systems that transmit forward link signals without transmitting a forward link pilot signal. By eliminating the forward link pilot signal, capacity and throughput may be beneficially improved.

A cellular wireless communication network may transmit spread spectrum signals that are spread by a pseudonoise (PN) code with any of a plurality of PN offsets, such that different coverage areas use different PN offsets. In each coverage area, the network may transmit a plurality of forward link channels, each defined by a respective Walsh code, without transmitting a pilot signal. A wireless communication device (WCD) may use a Costas loop, squaring loop, or other known technique, to coherently demodulate any of the forward link channels without using a pilot signal. The WCD may determine the PN offset that is used in a given coverage area from a broadcast message that is transmitted repetitively in a broadcast channel, such as a sync channel or paging channel. At least part of the broadcast message may be the same each time that it is transmitted. For example, the broadcast message may include a standard header or may include identifying information such as a system identification (SID) or network identification (NID) that can be predicted in advance. The WCD may take advantage of the predictable nature of the broadcast message by selecting a target bit sequence that would be expected to be included in the broadcast message. The WCD may then determine the PN offset used in its coverage area by trying different PN offsets, while applying the Walsh code of the broadcast channel, until it finds an effective PN offset that enables the WCD to recover the target bit sequence.

In order to find the effective PN offset more quickly, the WCD may obtain an estimate of its current location (e.g., using GPS) and may consult an internal or external database that identifies the PN offsets that would be expected to be available in that location. Thus, the WCD may select a target PN offset based on its current location. The WCD may begin with this target PN offset in the process of finding the effective PN offset. If the target PN offset does not enable the WCD to recover the target bit sequence, then the WCD may adjust the target PN offset and try again. The adjustment could be as small as one chip, for example, to account for clock offset and/or propagation delay. Alternatively, the WCD may select a different target PN offset that corresponds to a different coverage area.

Once the WCD has found the effective PN offset, it may use the effective PN offset to receive the entire broadcast message. The broadcast message could be, for example, a synchronization message or other control message that enables the WCD to synchronize with the network. The WCD may then be able to receive other forward link signals and/or transmit reverse link signals to the network.

In this way, a WCD may be able to communicate with a spread spectrum communication system that does not use forward link pilot signals.

2. Exemplary Cellular Wireless Communication Network

Figure 2:
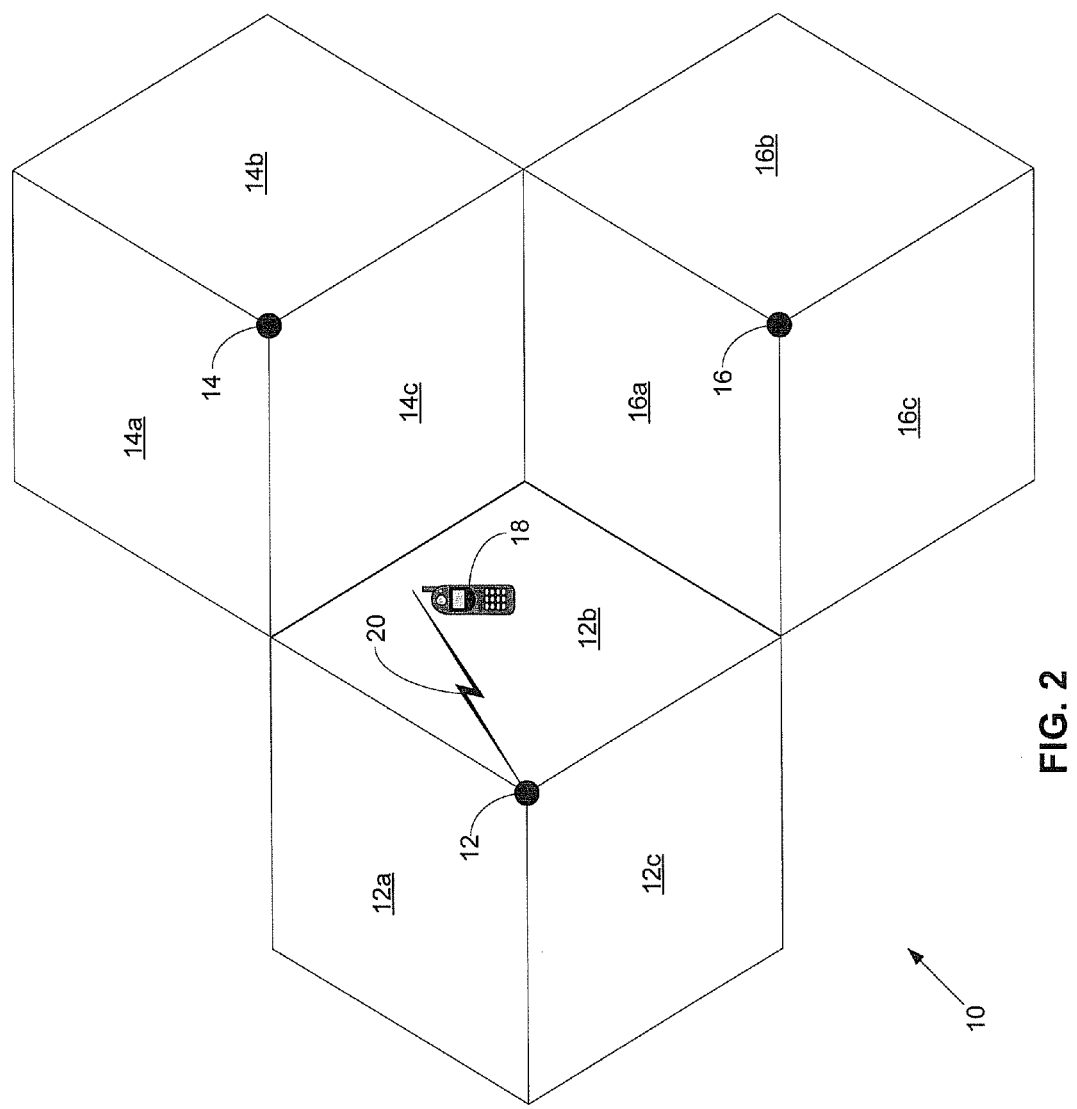
FIG. 2 is a schematic diagram of a cellular wireless communication network, in accordance with an exemplary embodiment.

FIG. 2 illustrates an exemplary cellular wireless communication network 10. Network 10 includes a plurality of base stations, exemplified in FIG. 2 by base stations 12, 14, and 16. Each of base stations 12, 14, and 16 defines at least one wireless coverage area, such as a cell or sector, within which the base station is able to wirelessly communication with wireless communication devices (WCDs), such as WCD 18. In this example, each base station defines three sectors, for example, using directional antennas. Thus, base station 12 defines sectors 12a, 12b, and 12c, base station 14 defines sectors 14a, 14b, and 14c, and base station 16 defines sectors 16a, 16b, and 16c. It is to be understood that this number of sectors is exemplary only, as a base station may define a greater or fewer number of sectors or may communicate omni-directionally throughout a cell, instead of in sectors. Further, it is to be understood that sectors 12a-c, 14a-c, and 16a-c are shown only schematically in FIG. 2. Thus, the geographical extent of a sector may be different than as shown in FIG. 2.

WCD 18 could be, for example, a wireless telephone, a wireless e-mail device, a wireless handheld computer, a wirelessly-equipped notebook computer, or other mobile device. WCD 18 may communicate with a base station, such as base station 12, over an air interface 20. Thus, WCD 18 may receive forward link signals transmitted by base station 12 over air interface 20, and base station 12 may receive reverse link signals transmitted by WCD 18 over air interface 20. The communications over air interface 20 may involve the exchange of voice, data, video, or other media. Base stations 12, 14, and 16 may support communication sessions (such as voice calls or data calls) between WCDs, such as WCD 18, and endpoints such as landline telephones, other WCDs, or servers. Thus, base stations 12, 14, and 16 may be communicatively coupled to a circuit-switched network, such as the public switched telephone network (PSTN), and/or a packet-switched network, such as the Internet.

In an exemplary embodiment, the communications over air interface 20 include spread spectrum signals. For example, base station 12 may transmit into sector 12b spread spectrum signals that are spread by a pseudonoise (PN) code. The spread spectrum signals transmitted by base station 12 may include a plurality of forward link signals in a plurality of forward link channels. Each forward link channel may be defined by a respective Walsh code. The forward link channels may include broadcast channels that may be received by any WCDs operating in the wireless coverage area (i.e., sector 12b) and may include assigned channels that are assigned to specific WCDs. The broadcast channels may include, for example, a sync channel that transmits a synchronization message and/or a paging channel that transmits page messages and system-related messages. Other broadcast channels may transmit other types of broadcast messages. The assigned channels may include, for example, forward traffic channels.

The forward link signals transmitted by base station 12 into sectors 12a and 12c, and the forward link signals transmitted by base stations 14 and 16 into their respective sectors, may have the same or similar channel structure. Thus, base stations 12, 14, and 16 may transmit spread spectrum signals that are spread by the same PN code, and the same Walsh codes may define the same types of forward link channels in each sector. However, the phase of the PN code may be different in different sectors. For example, cellular wireless communication network 10 may support a plurality of PN offsets, such that different PN offsets are used in different sectors. In this way, the forward link signals of a particular sector may be identified by the PN offset associated with that particular sector.

In some sectors of network 10, the spread spectrum communications may conform to a protocol such as IS-95 CDMA, 1xRTT CDMA, or EVDO. However, in at least one sector, the spread spectrum communications deviate from these standards by omitting the forward link pilot signal. For example, base station 12 may transmit spread spectrum signals into sector 12b without transmitting a pilot signal. Thus, when operating in sector 12b, WCD 18 may receive forward link signals from base station 12, e.g., in a forward traffic channel, without receiving a pilot signal from base station 12.

When moving into a wireless coverage area (e.g., sector 12b) that does not use a forward link pilot signal, WCD 18 may adjust its operation in several respects. First, since a pilot signal is typically used to coherently demodulate spread spectrum signals in cellular wireless communication networks, WCD 18 may instead coherently demodulate the forward link signals in sector 12b using a Costas loop, squaring loop, or any known technique that does not use a pilot signal. Second, since the signal strength of the pilot signal measured by the WCD is typically used for power control of the forward link, WCD 18 may instead use the signal strength of another forward link channel, such as a broadcast channel or a forward traffic channel, for power control of the forward link. Third, since the pilot signal is typically used for signal acquisition, WCD 18 may instead use a broadcast channel, such as a sync channel or a paging channel, for signal acquisition, as described in more detail below.

3. Exemplary Signal Acquisition System

Figure 3:
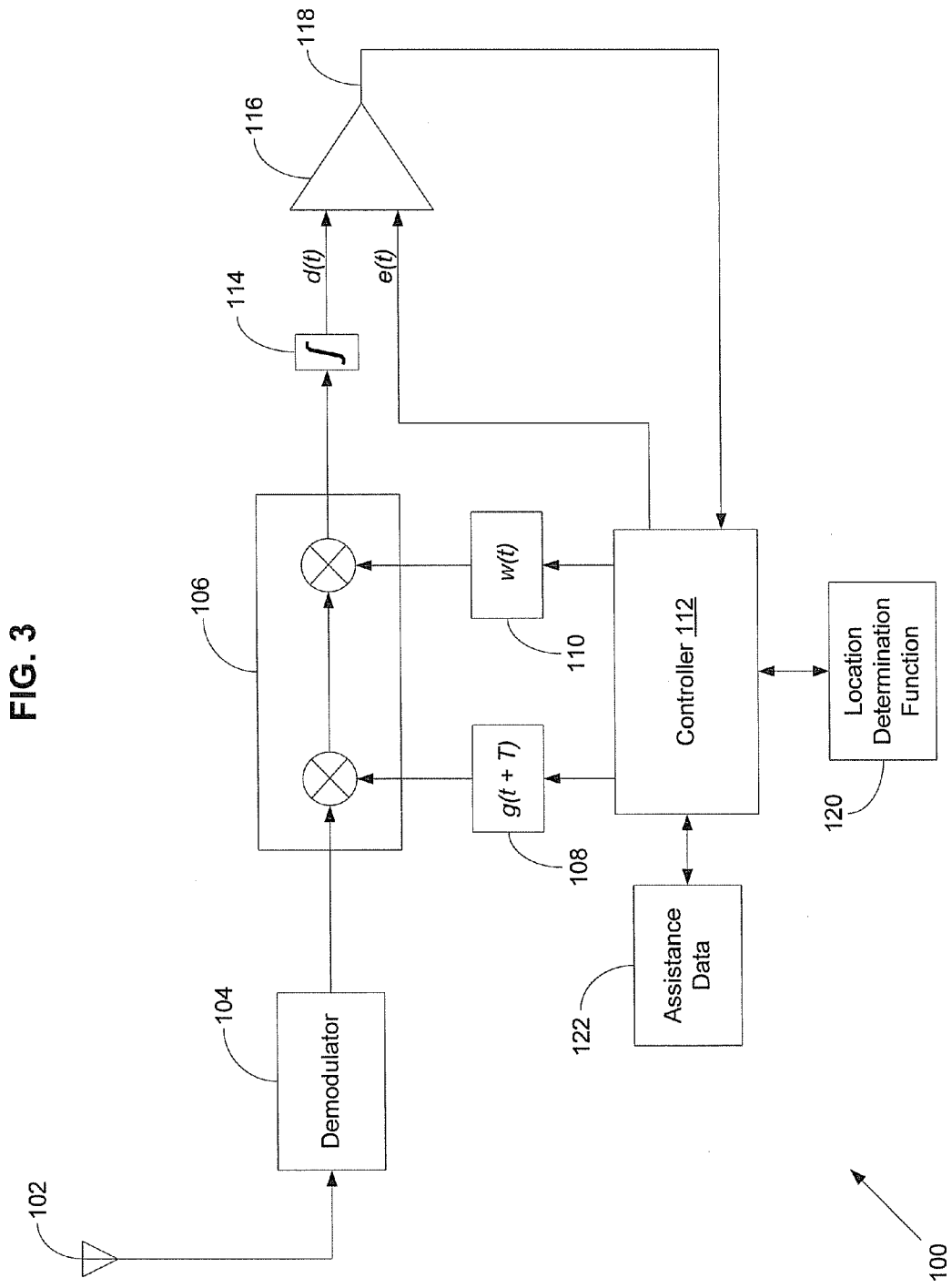
FIG. 3 is schematic diagram of a signal acquisition system of a wireless communication device, in accordance with an exemplary embodiment.

FIG. 3 illustrates an exemplary signal acquisition system 100 that may be used in a wireless communication device, such as WCD 18. System 100 includes an antenna 102 for wirelessly receiving a spread spectrum signal that is spread with a PN sequence of unknown phase, g(t+U), where U represents the unknown phase. The spread spectrum signal received by antenna 102 is coherently demodulated, without using a pilot signal, in demodulator 104 to provide a baseband signal. A correlator 106 applies a target PN sequence, g(t+T), where T represents a target phase, and a target Walsh function, w(t), corresponding to a target Walsh function, to the baseband signal to obtain a product signal. Correlator 106 may multiply the baseband signal with the target PN sequence and then the target Walsh function, as shown in FIG. 3. Alternatively, the order could be reversed.

The target PN sequence, g(t+T), may be generated by a PN sequence generator 108. The target Walsh function, w(t), may be generated by a Walsh function generator 110. Generators 108 and 110 may be controlled by a controller 112. As described in more detail below, controller 112 may select the target phase, T, used in generator 108. Controller 112 may also select the target Walsh code that generator 110 uses to generate the target Walsh function, w(t). The target Walsh code defines a target forward link channel, which could be a broadcast channel, such as a sync channel or paging channel.

An integrator 114 integrates the product signal from correlator 106 over a Walsh period, i.e., a time period over which different Walsh functions are orthogonal, to provide an output that is sampled at the end of the Walsh period. The sampled output may be identified as either a "0" or a "1" depending on whether it is below or above a threshold value. Integrator 114 may integrate the product signal over successive Walsh periods to obtain successive sampled outputs that define a recovered bit sequence, d(t). For example, integrator 114 may integrate the product signal over n Walsh periods to obtain a sequence of n bits.

Because of the pseudorandom nature of the PN sequence, the recovered bit sequence, d(t), will be essentially noise unless the target phase, T, matches the unknown phase, U. In other words, d(t) will correspond to the actual bit sequence encoded in the received spread spectrum signal only when T is equal to U. To determine whether the recovered bit sequence, d(t), corresponds to the actual bit sequence in the spread spectrum signal or just noise, a comparator 116 may compare d(t) to a target bit sequence, e(t), which may be selected by controller 112. Comparator 116 may provide an output 118 based on the comparison of d(t) and e(t). In particular, output 118 may indicate whether the two bit sequences match.

The target bit sequence, e(t), is a bit sequence that would be expected to be included in a message transmitted in the target forward link channel that is defined by the target Walsh code. As one example, the target forward link channel could be a sync channel that is used to continuously transmit a synchronization message. The synchronization message may include certain information that can be predicted in advance, such as a SID/NID identifier, time-multiplexed with less predictable information. The SID is a 15-bit identification number that identifies an entire "system" of base stations. The NID is a 16-bit identification number that identifies a "network" that is a subset of the "system." The "system" identified by a SID may correspond to a geographic area that is on the order of a 100 miles in diameter, and the "network" identified by a NID may correspond to a geographic area that is in the range of 5 to 50 miles in diameters. Thus, if the SID and/or NID are known or can be determined based on location, then the bits corresponding to their identification numbers can be used to define the target bit sequence, e(t).

As another example, the target forward link channel could be a paging channel that periodically transmits a system parameter message. The system parameter message may be expected to include a base station identifier, as well as other information. Thus, if the identifier of a nearby base station is known, then the target bit sequence, e(t), may correspond to this base station identifier.

Other examples are also possible. For example, a broadcast channel may transmit a broadcast message that includes a standard code (e.g., time-multiplexed with actual data) that may be used for signal acquisition. In that case, the target bit sequence, e(t), may correspond to the standard code. Beneficially, the standard code could be location-independent, so as to enable the corresponding target bit sequence to be used for signal acquisition in any location.

Controller 112 may control generator 108 in response to output 118. In particular, if output 118 indicates that d(t) and e(t) do not match, then controller 112 may control generator 108 to use a new target phase, T'. The new target phase, T', might differ from T by only a small amount, such as one chip. Alternatively, T', might differ from T by a large amount, for example, when controller 112 tries to acquire an entirely different PN offset. Using the new target phase, T', system 100 may recover another bit sequence d'(t), which comparator 116 may compare with e(t). If there is still no match, controller 112 may continue adjusting the target phase used in generator 108 until there is a match.

If output 118 indicates that d(t) and e(t) match, then controller 112 may determine that the target phase T now matches U. At that point, controller 112 may continue to have Walsh function generator 110 generate the Walsh function corresponding to the target forward link channel, for example, to receive the entire broadcast message of which the target bit sequence, e(t), was a part. Alternatively, controller 112 may control generator 110 to begin generating a different Walsh function, so as to receive a different forward link channel.

As noted above, the target bit sequence, e(t), that would be expected to be included in a broadcast message may depend on location. Since different sectors may use different PN offsets, the phase of the spread spectrum signal received by antenna 102 may also depend on location. Thus, controller 112 may select a target phase, T, that would be expected to be used where signal acquisition system 100 is currently located.

To determine location, signal acquisition system 100 may include a location determination function 120 communicatively coupled to controller 112. Location determination function 120 could be, for example, a GPS receiver. Alternatively, location determination function 120 may be able to determine its location in other ways, for example, using terrestrial signals.

Controller 112 may also be able to refer to assistance data 122, which may correlate target bit sequences and/or PN offsets to location, in order to assist the signal acquisition process. Thus, in an exemplary embodiment, controller 112 may obtain a current location from location determination function 120 and then consult assistance data 122 to determine what target bit sequences and/or PN offsets would be expected at that location. In this way, controller 112 may select a target bit sequence, e(t), based on location and may select a target phase, T, based on location.

By determining what PN offset to expect in a given location, and selecting a target phase, T, that corresponds to the expected PN offset, signal acquisition system 100 may be able to match the unknown phase, U, more quickly. For example, location determination function 120 may be able to provide a location fix that is precise enough that the value of T obtained from assistance data 122 could match U initially, without any adjustment. Even if T does not match U initially, then the difference might be the result of the propagation delay of the spread spectrum signal from the base station to the WCD and/or due to imperfect synchronization between the WCD's time base and the base station's time base. In either case, the difference between T and U would be relatively small, such that T could be matched to U after only a small number adjustments.

In addition to controlling signal acquisition system 100, controller 112 may control other operations in a WCD. For example, the WCD may include a user interface that allows a user to interact with the WCD. The user interface may include a speaker and microphone that enable the WCD to receive audio from the user and to convey audio to the user, for example, when the WCD is involved in a voice call. The user interface may also include a display screen for displaying text, graphics, video or other visual information to the user and may include one or more input devices, such as a keypad, buttons, or touch screen, to receive input from the user. The user interface may be coupled to controller 112 so that user instructions received through the user interface may control the operation of the WCD.

With regard to the signal acquisition process, the user interface may display an indication to the user when the signal acquisition process occurs so that the user will recognize that wireless service will not be available until the signal acquisition process is complete. In some cases, the user interface may be configured to receive a location indication from the user, which controller 112 may then rely on when selecting the target phase, T, and/or target bit sequence, e(t), for signal acquisition.

4. Exemplary Signal Acquisition Method

Figure 4:
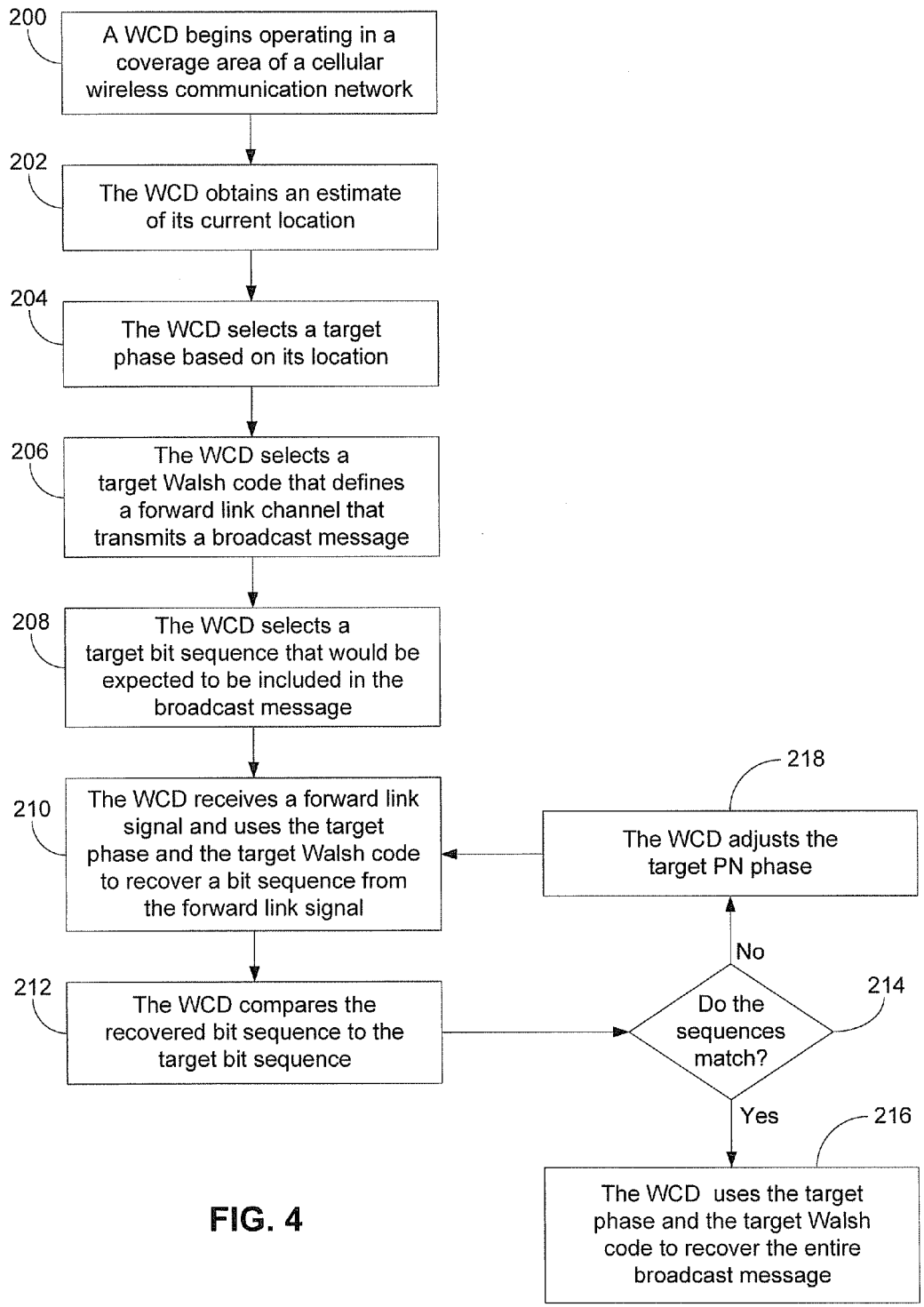
FIG. 4 is a flow chart illustrating a method for acquiring a spread spectrum signal without using a pilot signal, in accordance with an exemplary embodiment.

FIG. 4 is a flow chart illustrating an exemplary method for acquiring a spread spectrum signal, without using a pilot signal. The method is described with reference to a WCD operating in a cellular wireless communication network in which the spread spectrum signals in different wireless coverage areas have different PN offsets, for example, as illustrated in FIG. 2. It is to be understood, however, that other network configurations could be used.

The method may begin when a WCD (e.g., WCD 18) begins operating in a coverage area of a cellular wireless communication network (e.g., sector 12b), as indicated by block 200. For example, the WCD may have just powered up at that location or may have moved into that coverage area after being in an area, such as a building or tunnel, where wireless service was unavailable. Before attempting to acquire a spread spectrum signal transmitted by the cellular wireless communication network, the WCD may first obtain an estimate of its current location, as indicated by block 202. The WCD may determine its location, for example, by using a satellite-based position system, such as GPS, by using terrestrial signals, such as WiFi signals, or by using a combination of satellite-based and earth-based signals. Alternatively, the WCD may receive an indication of its location from the user.

The WCD may then select a target phase based on its location, as indicated by block 204. For example, the WCD may have access to either an internal database or an external database that identifies which PN offsets are used in which locations. Thus, the WCD may select a target phase that corresponds to a PN offset that would be expected to be available at its current location.

The WCD may also select a target Walsh code that defines a forward link channel that transmits a broadcast message, as indicated by block 206. For example, the WCD may select a Walsh code of a sync channel or paging channel. Thus, this method differs from conventional signal acquisition methods that rely on a pilot signal by instead using a broadcast message for signal acquisition. In this regard, the broadcast message transmits data that includes both ones and zeroes, unlike a conventional pilot signal which is all zeroes.

In addition, the WCD may select a target bit sequence that would be expected to be included in the broadcast message, as indicated by block 208. The target bit sequence could be part of the data in the broadcast message, such as a SID/NID or other network parameter. Alternatively, the target bit sequence could be a code that is included in the broadcast message for signal acquisition purposes. Either way, the target bit sequence would be time-multiplexed with one or more additional bit sequences in the broadcast message. As a result, the target bit sequence is preferably in a broadcast message that is transmitted at well-defined times, so that the WCD can determine when the target bit sequence will be transmitted. In addition, whereas a pilot signal is all zeroes, the target bit sequence may include both ones and zeroes.

After making these selections, the WCD receives a forward link signal and uses the target phase and the target Walsh code to recover a bit sequence from the forward link signal, as indicated by block 210. The WCD then compares the recovered bit sequence to the target bit sequence 212. How the WCD proceeds depends on whether the sequences match, as indicated by block 214. If the recovered bit sequence matches the target bit sequence, then the WCD may use the target phase and the target Walsh code to recover the entire broadcast message, as indicated by block 216. If the bit sequences do not match, then the WCD may adjust the target phase, as indicated by block 218, and use the adjusted target phase to recover another bit sequence from the forward link signal, as indicated by block 210.

In this way, a WCD may beneficially be able to acquire a spread spectrum signal without using a pilot signal.

5. Conclusion

Exemplary embodiments of the present invention have been described above. Those skilled in the art will understand, however, that changes and modifications may be made to these embodiments without departing from the true scope and spirit of the invention, which is defined by the claims.

What is claimed is:

1. A method for signal acquisition in a wireless network in which forward link signals are spread by a pseudonoise (PN) sequence with any of a plurality of PN offsets, said method comprising:
    a wireless communication device (WCD) obtaining an estimate of its current location;
    said WCD selecting a target bit sequence based on said current location;
    said WCD receiving a forward link signal transmitted by said wireless network, wherein said forward link signal is spread by said PN sequence with an unknown PN offset, and wherein said forward link signal encodes said target bit sequence that is time-multiplexed with an additional bit sequence, said additional bit sequence being different than said target bit sequence; and
    said WCD finding an effective PN offset that enables said WCD to despread said forward link signal and recover said target bit sequence.

2. The method of claim 1, further comprising:
    said WCD coherently demodulating said forward link signal without using a pilot signal.

3. The method of claim 1, further comprising:
    said WCD using said effective PN offset to despread said forward link signal and recover said additional bit sequence.

4. The method of claim 3, wherein said forward link signal encodes said target bit sequence and said additional bit sequence using a Walsh code.

5. The method of claim 4, wherein said Walsh code defines a broadcast channel that transmits a broadcast message.

6. The method of claim 5, wherein said broadcast channel is a sync channel or a paging channel.

7. The method of claim 5, wherein said target bit sequence and said additional bit sequence are part of said broadcast message.

8. The method of claim 1, wherein said target bit sequence includes at least one 0 and at least one 1.

9. The method of claim 1, wherein said WCD finding an effective PN offset that enables said WCD to despread said forward link signal and recover said target bit sequence comprises:
    said WCD selecting a target PN offset; and
    determining whether said target PN offset is able to despread said forward link signal so as to recover said target bit sequence.

10. The method of claim 9, wherein said WCD selecting said target PN offset comprises:

said WCD selecting said target PN offset based on said current location.

11. A method for a wireless communication device (WCD), said method comprising:
said WCD receiving a spread spectrum signal that is spread by a pseudonoise (PN) sequence of unknown phase;
said WCD coherently demodulating said spread spectrum signal, without using a pilot signal, to obtain a baseband signal;
said WCD generating said PN sequence with a target phase to provide a target PN sequence;
said WCD generating a target Walsh function corresponding to a target Walsh code;
said WCD applying said target PN sequence and said target Walsh function to said baseband signal to obtain a product signal;
said WCD integrating said product signal over successive Walsh code periods to obtain a recovered bit sequence;
said WCD comparing said recovered bit sequence to a target bit sequence;
said WCD determining whether said recovered bit sequence matches said target bit sequence;
in response to a determination that said recovered bit sequence matches said target bit sequence, said WCD using said target PN sequence and said target Walsh function to recover said broadcast message from said spread spectrum signal; and
in response to a determination that said recovered bit sequence does not match said target bit sequence, said WCD adjusting said target phase.

12. The method of claim 11, wherein said target Walsh code defines a forward link channel that transmits a broadcast message.

13. A wireless communication device, comprising:
an antenna for wirelessly receiving a spread spectrum signal, wherein said spread spectrum signal is spread by a pseudonoise (PN) sequence of unknown phase;
a demodulator for coherently demodulating said spread spectrum signal, without using a pilot signal, to provide a baseband signal;
a PN sequence generator for generating said PN sequence with a target phase to provide a target PN sequence;
a Walsh function generator for generating a target Walsh function corresponding to a target Walsh code;
a correlator for applying said target PN sequence and said target Walsh function to said baseband signal to obtain a product signal;
an integrator for integrating said product signal over successive Walsh code periods to obtain a recovered bit sequence;
a comparator for providing an output based on a comparison of said recovered bit sequence to a target bit sequence; and
a controller, wherein said controller is configured to select at least one of said target phase or said target bit sequence based on a current location of said wireless communication device.

14. The wireless communication device of claim 13, wherein said controller is configured to control said target phase based on said output.

15. The method of claim 1, wherein a wireless communication device (WCD) obtaining an estimate of its current location comprises said WCD using a satellite-based positioning system.

16. The method of claim 1, wherein said target bit sequence comprises at least one of a system identifier, a network identifier, or a base station identifier.

17. The method of claim 1, further comprising:
said WCD obtaining an estimate of its current location; and
said WCD selecting said target bit sequence bases on said current location.

18. The method of claim 17, wherein said target bit sequence comprises at least one of a system identifier, a network identifier, or a base station identifier.

19. The wireless communication device of claim 13, further comprising (i) a location determination function configured to determine location and (ii) assistance data that correlates PN offsets to location, wherein said controller is configured to select said target phase by a process comprising:
obtaining said current location from said location determination function; and
consulting said assistance data to determine what PN offsets would be expected at said current location.

20. The wireless communication device of claim 13, further comprising (i) a location determination function configured to determine location and (ii) assistance data that correlates target bit sequences to location, wherein said controller is configured to select said target bit sequence by a process comprising:
obtaining said current location from said location determination function; and
consulting said assistance data to determine what target bit sequences would be expected at said current location.

* * * * *